(12) United States Patent
Fu

(10) Patent No.: US 11,378,858 B2
(45) Date of Patent: Jul. 5, 2022

(54) LIQUID CRYSTAL DISPLAY PANEL

(71) Applicant: SHENZHEN CHINA STAR OPTOELECTRONICS SEMICONDUCTOR DISPLAY TECHNOLOGY CO., LTD., Shenzhen (CN)

(72) Inventor: Min Fu, Shenzhen (CN)

( * ) Notice: Subject to any disclaimer, the term of this patent is extended or adjusted under 35 U.S.C. 154(b) by 240 days.

(21) Appl. No.: 16/625,776

(22) PCT Filed: Dec. 5, 2019

(86) PCT No.: PCT/CN2019/123288
§ 371 (c)(1),
(2) Date: Dec. 23, 2019

(87) PCT Pub. No.: WO2021/103091
PCT Pub. Date: Jun. 3, 2021

(65) Prior Publication Data
US 2021/0349365 A1    Nov. 11, 2021

(30) Foreign Application Priority Data
Nov. 26, 2019   (CN) .......................... 201911169819.X

(51) Int. Cl.
*G02F 1/1362* (2006.01)
*G02F 1/1335* (2006.01)
(Continued)

(52) U.S. Cl.
CPC .. *G02F 1/136295* (2021.01); *G02F 1/133512* (2013.01); *G02F 1/134309* (2013.01); *G02F 1/136222* (2021.01); *G02F 1/1368* (2013.01)

(58) Field of Classification Search
CPC ......... G02F 1/136295; G02F 1/134309; G02F 1/133512; G02F 1/136222; G02F 1/1368; G02F 1/136286; G02F 1/133388
See application file for complete search history.

(56) References Cited

U.S. PATENT DOCUMENTS

2008/0113461 A1* 5/2008 Tung ................. G02F 1/136209
                                                       438/30
2011/0090445 A1* 4/2011 Kim ..................... G02F 1/1339
                                                       349/139
(Continued)

FOREIGN PATENT DOCUMENTS

CN       109426018 A     3/2019
CN       110109300 A     8/2019
(Continued)

*Primary Examiner* — Mariam Qureshi

(57) ABSTRACT

The present disclosure provides a liquid crystal display panel, a color resistance layer is disposed on an array substrate corresponding to the bonding terminals, a plurality of conductive components are disposed on a surface of the color resistance layer and one-to-one electrically connected to metal lines, a first silver line is in contact with each of the metal lines and the conductive components corresponding to the metal lines in a thickness direction of the liquid crystal display panel, and a second silver line is in contact with a surface of the conductive components near the color filter substrate, to improve display effect of the liquid crystal display panel.

18 Claims, 1 Drawing Sheet

(51) Int. Cl.
 *G02F 1/1343* (2006.01)
 *G02F 1/1368* (2006.01)

(56) References Cited

U.S. PATENT DOCUMENTS

2020/0029439 A1\* 1/2020 Zhang .................... H05K 3/321
2020/0103715 A1\* 4/2020 Yang .................... G02F 1/1339

FOREIGN PATENT DOCUMENTS

| CN | 110119054 A | 8/2019 |
| CN | 110286531 A | 9/2019 |
| CN | 110346957 A | 10/2019 |

\* cited by examiner

LIQUID CRYSTAL DISPLAY PANEL

FIELD OF INVENTION

The present disclosure relates to the field of display technology, and more particularly, to a liquid crystal display panel.

BACKGROUND OF INVENTION

At present, in order to achieve narrow frame of liquid crystal display panels, a file chip thin film is bonded on one terminal of the liquid crystal display panels by side-bonding technology. The side-bonding technology includes printing conductive silver paste on one terminal of the liquid crystal display panels bonding the file chip thin film, drying conductive silver paste to form silver lines, then bonding the file chip thin film on the silver lines. Current problems of the side-bonding technology are the silver lines broken caused by the silver paste infiltrating into a gap of the liquid crystal display panel, and serious attenuation of electrical signal transmission caused by the silver lines being in contact with metal lines of the liquid crystal display panel in a thickness direction.

Therefore, it is necessary to provide a liquid crystal display panel to resolve the problem that the silver lines broken caused by the silver paste infiltrating into a gap of the liquid crystal display panel, and serious attenuation of electrical signal transmission caused by the silver lines being in contact with metal lines of the liquid crystal display panel in a thickness direction.

SUMMARY OF INVENTION

A purpose of the present disclosure is to provide a liquid crystal display panel to resolve the problem that the silver lines broken caused by the silver paste infiltration, and attenuation of electrical signal caused by a small contact area between the silver lines and the metal lines in the side-bonding technology.

To achieve the purpose above mentioned, the present disclosure provides a liquid crystal display panel, wherein the liquid crystal display panel comprises a bonding terminal, an array substrate, a color filter substrate disposed opposite to the array substrate, and a plurality of silver lines. The array substrate comprises a first substrate, a plurality of metal lines, a color resistance layer, and a plurality of conductive components. The plurality of metal lines are disposed on the first substrate and an opposite surface of the color filter substrate, and extends to the bonding terminal. The color resistance layer is disposed on one side of the metal lines away from the first substrate, and is formed on the bonding terminal. The plurality of conductive components are disposed at least on a surface of the color resistance layer away from the first substrate, and one-to-one electrically connected to the plurality of metal lines. The plurality of the silver lines are disposed on the bonding terminal of the liquid crystal display panel, each of the silver lines comprises a first silver line and a second silver line connected to the first silver line, each of the first silver line of the silver lines is in contact with each of the metal lines and the conductive components corresponding to the metal lines in a thickness direction of the liquid crystal display panel, and each of the second silver line of the silver lines is in contact with a surface of the conductive components near the color filter substrate. The color resistance layer is blue color resistance layer. The conductive components are patterned transparent conductive layers.

In the liquid crystal display panel above mentioned, a thickness of the second silver line is equal to an interval between the array substrate corresponding to the bonding terminal and the color filter substrate corresponding to the bonding terminal.

In the liquid crystal display panel above mentioned, the array substrate comprises a pixel electrode, and the pixel electrode is disposed in a same layer with the patterned transparent conductive layers.

In the liquid crystal display panel above mentioned, each of the metal lines comprises a first metal line and a second metal line, the first metal line is disposed near the first substrate, the second metal line is disposed on one side of the first metal line away from the first substrate, each of the conductive components is electrically connected to the first metal line through at least one first through-hole, and each of the conductive components is electrically connected to the second metal line through at least one second through-hole.

In the liquid crystal display panel above mentioned, the array substrate comprises a first insulating layer and a second insulating layer, the first insulating layer is disposed between the first metal line and the second metal line, the second insulting layer is disposed between the second metal line and the color resistance layer, the first through-hole penetrates the color resistance layer, the second insulating layer, and the first insulating layer, and the second through-hole penetrates the color resistance layer and the second insulating layer.

In the liquid crystal display panel above mentioned, the conductive components extend from the surface of the color resistance layer away from the first substrate to an edge of the second metal line near the bonding terminal of the liquid crystal display panel, and is in contact with the second silver line.

In the liquid crystal display panel above mentioned, the color filter substrate comprises a second substrate and a black matrix layer disposed on the second substrate near a surface of the first substrate, and the black matrix layer is disposed on the bonding terminal of the liquid crystal display panel.

In the liquid crystal display panel above mentioned, an interval between the array substrate corresponding to the bonding terminal and the color filter substrate corresponding to the bonding terminal ranges from 2.5 um to 4.5 um.

A liquid crystal display panel comprises a bonding terminal, an array substrate, a color filter substrate disposed opposite to the array substrate, and a plurality of silver lines. The array substrate comprises a first substrate, a plurality of metal lines, a color resistance layer, and a plurality of conductive components. The plurality of metal lines are disposed on the first substrate and an opposite surface of the color filter substrate, and extends to the bonding terminal. The color resistance layer is disposed on one side of the metal lines away from the first substrate, and is formed on the bonding terminal. The plurality of conductive components are disposed at least on a surface of the color resistance layer away from the first substrate, and one-to-one electrically connected to the plurality of metal lines. The plurality of the silver lines are disposed on the bonding terminal of the liquid crystal display panel, each of the silver lines comprises a first silver line and a second silver line connected to the first silver line, each of the first silver line of the silver lines is in contact with each of the metal lines and the conductive components corresponding to the metal lines in a thickness direction of the liquid crystal display panel, and each of the second silver line of the silver lines is in contact with a surface of the conductive components near the color filter substrate.

In the liquid crystal display panel above mentioned, a thickness of the second silver line is equal to an interval between the array substrate corresponding to the bonding terminal and the color filter substrate corresponding to the bonding terminal.

In the liquid crystal display panel above mentioned, the array substrate comprises a pixel electrode, and the pixel electrode is disposed in a same layer with the patterned transparent conductive layers.

In the liquid crystal display panel above mentioned, each of the metal lines comprises a first metal line and a second metal line, the first metal line is disposed near the first substrate, the second metal line is disposed on one side of the first metal line away from the first substrate, each of the conductive components is electrically connected to the first metal line through at least one first through-hole, and each of the conductive components is electrically connected to the second metal line through at least one second through-hole.

In the liquid crystal display panel above mentioned, the array substrate comprises a first insulating layer and a second insulating layer, the first insulating layer is disposed between the first metal line and the second metal line, the second insulting layer is disposed between the second metal line and the color resistance layer, the first through-hole penetrates the color resistance layer, the second insulating layer, and the first insulating layer, and the second through-hole penetrates the color resistance layer and the second insulating layer.

In the liquid crystal display panel above mentioned, the conductive components extend from the surface of the color resistance layer away from the first substrate to an edge of the second metal line near the bonding terminal of the liquid crystal display panel, and is in contact with the second silver line.

In the liquid crystal display panel above mentioned, the color filter substrate comprises a second substrate and a black matrix layer disposed on the second substrate near a surface of the first substrate, and the black matrix layer is disposed on the bonding terminal of the liquid crystal display panel.

In the liquid crystal display panel above mentioned, an interval between the array substrate corresponding to the bonding terminal and the color filter substrate corresponding to the bonding terminal ranges from 2.5 um to 4.5 um.

The present disclosure provides a liquid crystal display panel to reduce an interval of bonding terminals of the liquid crystal display panel by disposing a color resistance layer on an array substrate corresponding to the bonding terminals, and to reduce risk of the silver lines broken caused by silver paste infiltration. A plurality of conductive components are disposed on a surface of the color resistance layer away from the first substrate and one-to-one electrically connected to metal lines, a first silver line of the silver lines is in contact with each of the metal lines and the conductive components corresponding to the metal lines in a thickness direction of the liquid crystal display panel, and each of the second silver line of the silver lines is in contact with a surface of the conductive components near the color filter substrate, which increase a path of the silver lines to an output electrical signal to the metal lines and reduces risk of attenuation of electrical signal in the side-bonding technology, thereby improving display effect of the liquid crystal display panel.

DETAILED DESCRIPTION OF PREFERRED EMBODIMENTS

The technical solutions in the embodiments of the present disclosure will be clearly and completely described below in conjunction with the accompanying drawings in the embodiments of the present disclosure. Obviously, the embodiments described are merely a part of the present disclosure, rather than all the embodiments. All other embodiments obtained by the person having ordinary skill in the art based on embodiments of the disclosure, without making creative efforts, are within the scope of the present disclosure.

Figure 1:
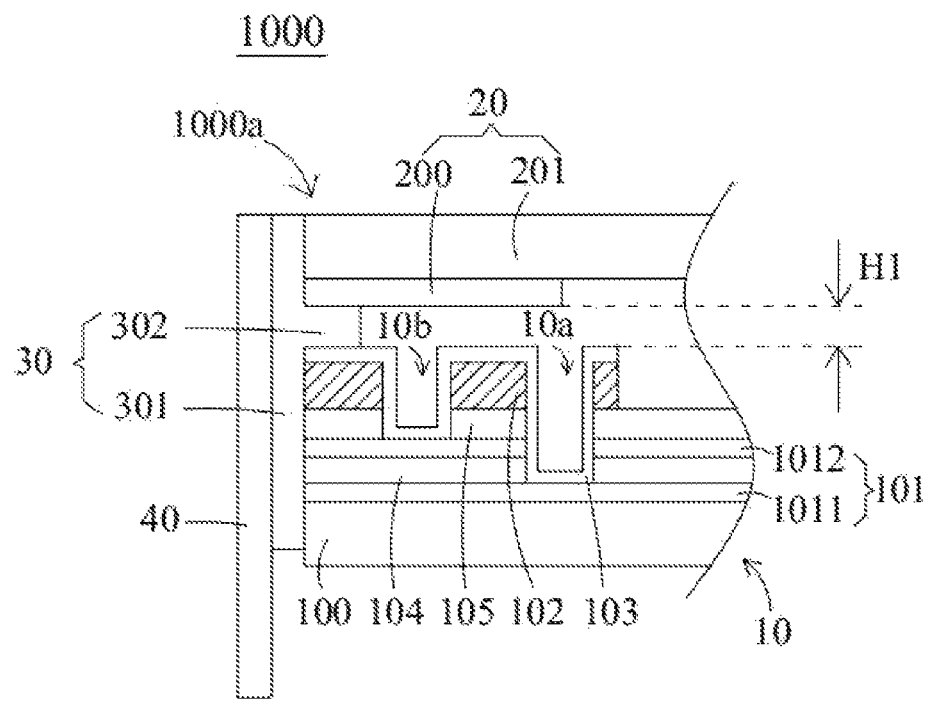
FIG. 1 is a schematic structural diagram of a liquid crystal display panel of an embodiment of the present disclosure.

Referring to FIG. 1, FIG. 1 is a schematic structural diagram of a liquid crystal display panel of an embodiment of the present disclosure. The liquid crystal display panel 1000 may be twisted nematic liquid crystal display panels, flat conversion liquid crystal panels, and vertical alignment liquid crystal display panels. The liquid crystal display panel 1000 comprises a bonding terminal 1000a used for bonding a file chip film 40. The liquid crystal display panel 1000 comprises an array substrate 10, a color filter substrate 20, a plurality of silver lines 30, and the file chip film 40. The array substrate is opposite disposed with the color filter substrate 20, and the plurality of silver lines 30 are disposed on the bonding terminal 1000a of the liquid crystal display panel 1000. The file chip film 40 is bonded on the plurality of silver lines 30 to be bonded on the bonding terminal 1000a of the liquid crystal display panel 1000 by a conductive plastic (not shown).

The array substrate 10 comprises a first substrate 100, a plurality of metal lines 101, a color resistance layer 102, a plurality of conductive components 103, a first insulating layer 104, and a second insulating layer 105. The plurality of metal lines 101 are disposed on the first substrate 100 and an opposite surface of the color filter substrate 20 and extends to the bonding terminal 1000a. The color resistance layer 102 is disposed on one side of the metal lines 101 away from the first substrate 100 and is formed on the bonding terminal 1000a. The plurality of conductive components 103 are disposed at least on a surface of the color resistance layer 102 away from the first substrate 100, and one-to-one electrically connected to the plurality of metal lines 101.

Each of the metal lines 101 comprises a first metal line 1011 and a second metal line 1012, the first metal line 1011 is disposed near the first substrate 100, the second metal line 1012 is disposed on one side of the first metal line 1011 away from the first substrate 100. When a thin film transistor of the array substrate 10 is bottom-gate thin film transistor, the first metal line 1011 may be disposed in a same layer with a gate of the thin film transistor of the array substrate 10, and the second metal line 1012 may be disposed in a same layer with a source/drain of the thin film transistor of the array substrate 10. A thickness of the first metal line and the second metal line range from 0.25 um to 0.6 um. For example, the thickness of the first metal line is 0.3 um, and the thickness of the second metal line is 0.3 um. The first metal line 1011 is made of at least one of molybdenum, aluminum, titanium, copper, and silver. The second metal line 1012 is made of at least one of molybdenum, aluminum, titanium, copper, and silver.

A first insulating layer 104 is disposed between the first metal line 1011 and the second metal line 1012, and a second insulting layer 105 is disposed between the second metal line 1012 and the color resistance layer 102. The first insulating layer 104 may be a gate insulating layer, and the second insulating layer 105 may be an interlayer insulating layer. The gate insulating layer is made of at least one of silicon nitride and silicon oxide. The interlayer insulating layer is made of at least one of silicon nitride and silicon oxide. A thickness of the gate insulating layer ranges from 1500 Å to 2500 Å. A thickness of the interlayer insulating layer ranges from 3000 Å to 6000 Å.

The plurality of conductive components 103 are respectively disposed corresponding to the plurality of metal lines 101. An interval between two adjacent conductive components ranges form 20 um to 100 um. Each of the conductive components 103 is electrically connected to the first metal line 1011 through at least one first through-hole 10a, and each of the conductive components 103 is electrically connected to the second metal line 1012 through at least one second through-hole 10b. The first through-hole 10a penetrates the color resistance layer 102, the second insulating layer 105, and the first insulating layer 104, and the second through-hole 10b penetrates the color resistance layer 102 and the second insulating layer 105. A shape of the first through-hole 10a and the second through-hole 10b is a square or a circle. When the shape of the first through-hole 10a and the second through-hole 10b is a square, a side length of the square through-hole ranges from 8 um to 12 um. The number of the first through-hole 10a corresponding to each of the conductive components 103 and the number of second through-hole 10b corresponding to the same conductive components 103 are both greater than or equal to two, to ensure the conduction of the first metal line 1011 and the second metal line 1012. The conductive components 103 are in contact with the first metal line 1011 and the second metal line 1012, so that the first metal line 1011 and the second metal line 1012 are bridge connection. The silver paste infiltration causes that the silver lines are in contact with the conductive components 103 during preparation of the silver lines, which increases the path of electrical signal transmission. It is not limited to traditional method, but the electrical signal is transmitted through contact in a thickness direction of the metal lines.

The conductive components 103 are a patterned transparent conductive layer to prevents the first metal line 1011 and the second metal line 1012 from being oxidized during conduction. The transparent conductive layer is made of at least one of indium zinc oxide and indium tin oxide. The array substrate further comprises a pixel electrode (not shown), the pixel electrode is disposed in a same layer with the patterned transparent conductive layer, and the pixel electrode and the patterned transparent conductive layer are formed by the patterned transparent conductive layer.

The color resistance layer 102 is used for reducing an interval between the array substrate 10 corresponding to the bonding terminal 1000a of the liquid crystal display panel 1000 and the color filter substrate 20 corresponding to the bonding terminal 1000a of the liquid crystal display panel 1000, thereby reducing risk of the silver lines broken caused by silver paste infiltration. A seal is disposed on the bonding terminal 1000a to reduce the interval between the array substrate 10 corresponding to the bonding terminal 1000a of the liquid crystal display panel 1000 and the color filter substrate 20 corresponding to the bonding terminal 1000a of the liquid crystal display panel 1000. In one aspect, it is difficult for the seal to form a through-hole, so that the conductive components used to increase contact area cannot be connected to the metal lines, and in another aspect, a seal is disposed on the bonding terminal 1000a to reduce an interval of the liquid crystal display panel 1000 corresponding to the bonding terminal, which leads to cutting and makes the liquid crystal display panel easy to break. An embodiment of the present disclosure adopts the color resistance layer 102 to reduce the interval of the liquid crystal display panel 1000 corresponding to the bonding terminal, which promotes connection of the conductive components 103 and the metal lines in subsequent preparation.

The color resistance layer 102 is a blue color resistance layer. At present, a thickness of the blue color resistance layer is greater than a thickness of the red color resistance layer and the yellow color resistance layer due to process reasons. The blue color resistance layer is more advantageous to reducing the interval between the array substrate 10 corresponding to the bonding terminal 1000a of the liquid crystal display panel 1000 and the color filter substrate 20 corresponding to the bonding terminal 1000a of the liquid crystal display panel 1000.

Each of the silver lines 30 comprises a first silver line 301 and a second silver line 302 connected to the first silver line 301, each of the first silver line 301 of the silver lines 30 is in contact with each of the metal lines 101 and the conductive components 103 corresponding to the metal lines 101 in a thickness direction of the liquid crystal display panel 1000, and each of the second silver line 302 of the silver lines 30 is in contact with a surface of the conductive components 103 near the color filter substrate 20. The plurality of silver lines are formed by printing conductive silver paste, and the conductive silver paste comprises nano silver and solvent. A part of the conductive silver paste is formed on a side of the array substrate 10, the first silver line 301 is formed after the solvent is volatilized, the part of the conductive silver paste infiltrates into a gap between the conductive components 103 and the color filter substrate 20, and the second silver line 302 is formed in contact with a surface of the conductive components 103 near the color filter substrate 20 after the solvent is volatilized, that is, using conductive silver paste infiltration to increase the electrical connection between the silver lines and the metal lines.

Further, a thickness of the second silver line 302 is equal to an interval between the array substrate 10 corresponding to the bonding terminal 1000a and the color filter substrate 20 corresponding to the bonding terminal 1000a, which increases the silver lines and the metal lines conduction mode and further reduces risk of the silver lines broken.

In one embodiment, an end of the array substrate 10 corresponding to the bonding terminal 1000a is flush with an end of the color filter substrate 20 corresponding to the bonding terminal 1000a, which is more advantageous for the liquid crystal display panel to achieve narrow frame. The first silver line 302 extends from a side of the array substrate 10 corresponding to the bonding terminal 1000a to a side of the color filter substrate 20 corresponding to the bonding terminal 1000a, which reduces risk of the silver line peeling.

An interval between the array substrate 10 corresponding to the bonding terminal 1000a and the color filter substrate 20 corresponding to the bonding terminal 1000a ranges from 2.5 um to 4.5 um. Base on lots of experiment, the interval between the array substrate 10 corresponding to the bonding terminal 1000a and the color filter substrate 20 corresponding to the bonding terminal 1000*a* is more advantageous to prevent the silver lines from broken.

The color filter substrate 20 comprises a second substrate 200 and a black matrix layer 201 disposed on the second substrate 200 near a surface of the first substrate 100, and the black matrix layer 201 is disposed on the bonding terminal 1000*a* of the liquid crystal display panel 1000. A thickness of the black matrix layer 201 ranges from 0.8 um to 1.2 um.

Figure 2:
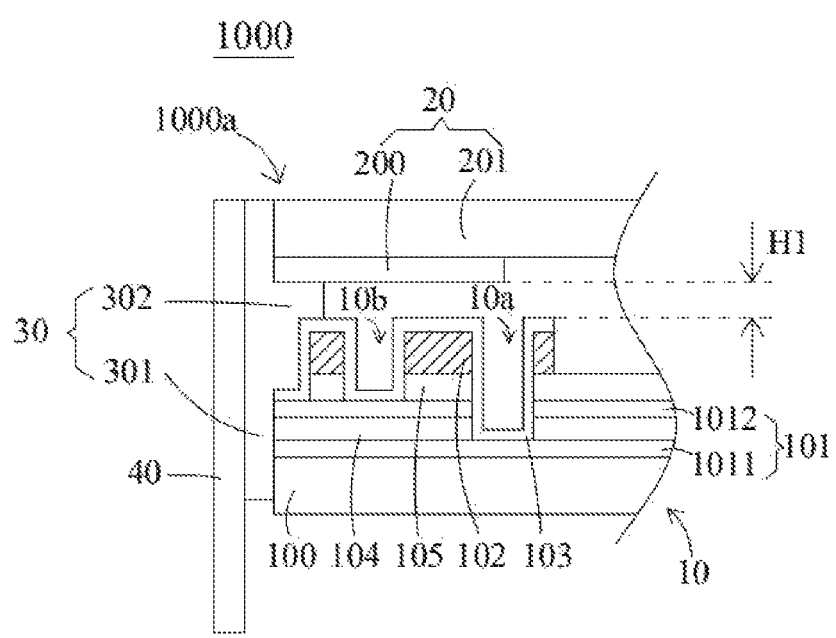
FIG. 2 is a schematic structural diagram of a liquid crystal display panel of another embodiment of the present disclosure.

Referring to FIG. 2, FIG. 2 is a schematic structural diagram of a liquid crystal display panel of another embodiment of the present disclosure. The liquid crystal display panel shown in FIG. 2 is basically similar to the liquid crystal display panel 1000 shown in FIG. 1, but the difference lies in, the conductive components 103 extend from the surface of the color resistance layer 102 away from the first substrate 100 to an edge of the second metal line 1012 near the bonding terminal 1000*a* of the liquid crystal display panel 1000 and is in contact with the second silver line 302, which further increases contact area of each of the silver lines with the conductive components 103 and reduces risk of attenuation of electrical signal transmission in the liquid crystal display panel, thereby improving display effect of side-bonding liquid crystal display panel.

When the color resistance layer 102 is formed at the bonding terminal 1000*a*, a part of the color resistance layer and the second insulating layer 105 near an edge of the liquid crystal display panel 1000 is removed, so that a part of the second metal line 1012 near the edge of the liquid crystal display panel 1000 is exposed. Then, the conductive components 103 subsequently prepared are formed on the second metal line 1012 near the edge of the liquid crystal display panel 1000, and the second silver line 302 of the silver lines subsequently prepared is in contact with the conductive components 103, which increases effective contact area between the conductive components 103 and the silver lines.

The description of the aforesaid embodiments is only used to help understand the present invention and the core idea thereof. At the same time, for one of ordinary skill in the art, according to the idea of the present disclosure, there will be changes in the specific embodiments and the scope of application. In summary, the content of this specification should not be construed as limiting the disclosure.

What is claimed is:

1. A liquid crystal display panel, wherein the liquid crystal display panel comprises a bonding terminal, an array substrate, a color filter substrate disposed opposite to the array substrate, and a plurality of silver lines;
the array substrate comprises a first substrate, a plurality of metal lines, a color resistance layer, and a plurality of conductive components;
the plurality of metal lines are disposed on a surface of the first substrate opposite to a surface of the color filter substrate, and extend to the bonding terminal;
the color resistance layer is disposed on one side of the metal lines away from the first substrate, and is formed on the bonding terminal;
the plurality of conductive components are disposed at least on a surface of the color resistance layer away from the first substrate and in a gap between the metal lines and the color filter substrate, and are one-to-one electrically connected to the plurality of metal lines;
the plurality of the silver lines are disposed on the bonding terminal of the liquid crystal display panel, each of the silver lines comprises a first silver line and a second silver line connected to the first silver line, each of the first silver line of the silver lines is in contact with each of the metal lines and the conductive components corresponding to the metal lines in a thickness direction of the liquid crystal display panel, each of the second silver line of the silver lines is disposed in a gap between the color filter substrate and the conductive components in a horizontal direction, and the second silver line is in contact with a surface of the conductive components near the color filter substrate in the liquid crystal display panel;
the color resistance layer is blue color resistance layer; and
the conductive components are patterned transparent conductive layers.

2. The liquid crystal display panel as claimed in claim 1, wherein a thickness of the second silver line is equal to an interval between the array substrate corresponding to the bonding terminal and the color filter substrate corresponding to the bonding terminal.

3. The liquid crystal display panel as claimed in claim 1, wherein the array substrate comprises a pixel electrode, and the pixel electrode is disposed in a same layer with the patterned transparent conductive layers.

4. The liquid crystal display panel as claimed in claim 1, wherein each of the metal lines comprises a first metal line and a second metal line, the first metal line is disposed near the first substrate, the second metal line is disposed on one side of the first metal line away from the first substrate, each of the conductive components is electrically connected to the first metal line through at least one first through-hole, and each of the conductive components is electrically connected to the second metal line through at least one second through-hole.

5. The liquid crystal display panel as claimed in claim 4, wherein the array substrate comprises a first insulating layer and a second insulating layer, the first insulating layer is disposed between the first metal line and the second metal line, the second insulting layer is disposed between the second metal line and the color resistance layer, the first through-hole penetrates the color resistance layer, the second insulating layer, and the first insulating layer, and the second through-hole penetrates the color resistance layer and the second insulating layer.

6. The liquid crystal display panel as claimed in claim 4, wherein the conductive components extend from the surface of the color resistance layer away from the first substrate to an edge of the second metal line near the bonding terminal of the liquid crystal display panel, and is in contact with the second silver line.

7. The liquid crystal display panel as claimed in claim 1, wherein the color filter substrate comprises a second substrate and a black matrix layer disposed on the second substrate near a surface of the first substrate, and the black matrix layer is disposed on the bonding terminal of the liquid crystal display panel.

8. The liquid crystal display panel as claimed in claim 1, wherein an interval between the array substrate corresponding to the bonding terminal and the color filter substrate corresponding to the bonding terminal ranges from 2.5 um to 4.5 um.

9. A liquid crystal display panel, wherein the liquid crystal display panel comprises a bonding terminal, an array substrate, a color filter substrate disposed opposite to the array substrate, and a plurality of silver lines;
the array substrate comprises a first substrate, a plurality of metal lines, a color resistance layer, and a plurality of conductive components;

the plurality of metal lines are disposed on the first substrate opposite to a surface of the color filter substrate, and extend to the bonding terminal;

the color resistance layer is disposed on one side of the metal lines away from the first substrate, and is formed on the bonding terminal;

the plurality of conductive components are disposed at least on a surface of the color resistance layer away from the first substrate and in a gap between the metal lines and the color filter substrate, and are one-to-one electrically connected to the plurality of metal lines;

the plurality of the silver lines are disposed on the bonding terminal of the liquid crystal display panel, each of the silver lines comprises a first silver line and a second silver line connected to the first silver line, each of the first silver line of the silver lines is in contact with each of the metal lines and the conductive components corresponding to the metal lines in a thickness direction of the liquid crystal display panel, each of the second silver line of the silver lines is disposed in a gap between the color filter substrate and the conductive components in a horizontal direction, and the second silver line is in contact with a surface of the conductive components near the color filter substrate in the liquid crystal display panel.

10. The liquid crystal display panel as claimed in claim 9, wherein a thickness of the second silver line is equal to an interval between the array substrate corresponding to the bonding terminal and the color filter substrate corresponding to the bonding terminal.

11. The liquid crystal display panel as claimed in claim 9, wherein the color resistance layer is blue color resistance layer.

12. The liquid crystal display panel as claimed in claim 9, wherein the conductive components are patterned transparent conductive layers.

13. The liquid crystal display panel as claimed in claim 12, the array substrate comprises a pixel electrode, and the pixel electrode is disposed in a same layer with the patterned transparent conductive layers.

14. The liquid crystal display panel as claimed in claim 9, wherein each of the metal lines comprises a first metal line and a second metal line, the first metal line is disposed near the first substrate, the second metal line is disposed on one side of the first metal line away from the first substrate, each of the conductive components is electrically connected to the first metal line through at least one first through-hole, and each of the conductive components is electrically connected to the second metal line through at least one second through-hole.

15. The liquid crystal display panel as claimed in claim 14, wherein the array substrate comprises a first insulating layer and a second insulating layer, the first insulating layer is disposed between the first metal line and the second metal line, the second insulting layer is disposed between the second metal line and the color resistance layer, the first through-hole penetrates the color resistance layer, the second insulating layer, and the first insulating layer, and the second through-hole penetrates the color resistance layer and the second insulating layer.

16. The liquid crystal display panel as claimed in claim 14, wherein the conductive components extend from the surface of the color resistance layer away from the first substrate to an edge of the second metal line near the bonding terminal of the liquid crystal display panel, and is in contact with the second silver line.

17. The liquid crystal display panel as claimed in claim 9, wherein the color filter substrate comprises a second substrate and a black matrix layer disposed on the second substrate near a surface of the first substrate, and the black matrix layer is disposed on the bonding terminal of the liquid crystal display panel.

18. The liquid crystal display panel as claimed in claim 9, wherein an interval between the array substrate corresponding to the bonding terminal and the color filter substrate corresponding to the bonding terminal ranges from 2.5 um to 4.5 um.

* * * * *